(12) United States Patent
Chen et al.

(10) Patent No.: US 11,382,066 B2
(45) Date of Patent: Jul. 5, 2022

(54) RADIO PBCH SCRAMBLING DESIGN

(71) Applicant: MEDIATEK INC., Hsinchu (TW)

(72) Inventors: Tao Chen, Beijing (CN); Wei-De Wu, Hsinchu (TW); Min Wu, Beijing (CN)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/643,937

(22) PCT Filed: Sep. 11, 2018

(86) PCT No.: PCT/CN2018/105055
§ 371 (c)(1),
(2) Date: Mar. 3, 2020

(87) PCT Pub. No.: WO2019/052443
PCT Pub. Date: Mar. 21, 2019

(65) Prior Publication Data
US 2020/0374836 A1 Nov. 26, 2020

Related U.S. Application Data

(60) Provisional application No. 62/571,416, filed on Oct. 12, 2017, provisional application No. 62/557,683, filed on Sep. 12, 2017.

(51) Int. Cl.
*H04W 72/04* (2009.01)
*H04W 72/00* (2009.01)
(Continued)

(52) U.S. Cl.
CPC ....... *H04W 72/005* (2013.01); *H04J 13/0029* (2013.01); *H04L 1/0061* (2013.01);
(Continued)

(58) Field of Classification Search
None
See application file for complete search history.

(56) References Cited

U.S. PATENT DOCUMENTS 10,652,064 B2 * 5/2020 Liu .................. H04W 48/12
2016/0080963 A1 3/2016 Marinier et al.

FOREIGN PATENT DOCUMENTS

CN 106936479 A 7/2017

OTHER PUBLICATIONS

Combined Taiwanese Office Action and Search Report dated Jun. 20, 2020 in Patent Application No. 108132695 (with English translation of Category of Cited Documents), 11 pages.

(Continued)

*Primary Examiner* — Willie J Daniel, Jr.
(74) *Attorney, Agent, or Firm* — Oblon, McClelland, Maier & Neustadt, L.L.P.

(57) ABSTRACT

Aspects of the disclosure provide a method for physical broadcast channel (PBCH) processing at a base station (BS) in a wireless communication system. The method can include performing a channel coding process to generate encoded PBCH data at the BS. The encoded PBCH data is to be carried in a synchronization signal block (SS block) having an SS block index (SBI), and transmitted from a cell having a cell ID. The method can further include performing a second scrambling over the encoded PBCH data with a second scrambling code determined based on the cell ID and the SBI to generate second scrambled PBCH data.

19 Claims, 15 Drawing Sheets

(51) Int. Cl.
H04W 76/27 (2018.01)
H04J 13/00 (2011.01)
H04L 1/00 (2006.01)
H04L 1/16 (2006.01)
H04W 56/00 (2009.01)

(52) U.S. Cl.
CPC ......... *H04L 1/1642* (2013.01); *H04W 56/001* (2013.01); *H04W 72/0466* (2013.01); *H04W 76/27* (2018.02)

(56) References Cited

OTHER PUBLICATIONS

International Search Report and Written Opinion dated Nov. 29, 2018 in PCT/CN2018/105055 filed on Sep. 11, 2018.
3GPP TSG RAN WG1 Meeting #90, R1-1713898, "Discussion on NR-PBCH design and PBCH-DMRS design," Source: NTT DOCOMO, INC., Aug. 21-25, 2017 (total 11 pages).
3GPP TSG RAN WG1 #90 Meeting, R1-1712265, "[NRAH2-05] Email discussion on DMRS Sequence for NR PBCH," Source: Intel Corporation, Aug. 21-25, 2017 (total 24 pages).

* cited by examiner

2$^{ND}$-SCRAMBLING OPERATION:

$$\tilde{b}(i) = (b(i)+c(i+vM_{bit}))\text{MOD2}$$

$b(0),...,b(M_{bit}-1)$ -- TO-BE-SCRAMBLED BITS;

$\tilde{b}(0),...,\tilde{b}(M_{bit}-1)$ -- SCRAMBLED BITS;

$c(i)$ -- GOLD SEQUENCE;

$v$ -- LSBs OF SS BLOCK INDEX;

FIG. 9

INITIALIZATION OF A GOLD SEQUENCE FOR GENERATION OF A 2$^{ND}$-SCRAMBLING CODE:

$$C_{INIT\_1} = (SBI+1) * 2^{10} + N_{ID}^{CELL}$$

$SBI$ – LSBs OF SS BLOCK INDEX;

$N_{ID}^{CELL}$ – CELL ID

FIG. 10

RADIO PBCH SCRAMBLING DESIGN

INCORPORATION BY REFERENCE

This present disclosure claims the benefit of U.S. Provisional Application No. 62/557,683, "New Radio PBCH Scrambling Design" filed on Sep. 12, 2017, and U.S. Provisional Application No. 62/571,416, "Scrambling Design for NR PBCH" filed on Oct. 12, 2017, both of which are incorporated herein by reference in their entirety.

TECHNICAL FIELD

The present disclosure relates to wireless communications, and specifically relates to physical broadcast channel (PBCH) data processing in wireless communication networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Fifth generation (5G) wireless communication networks employ beamforming techniques to concentrate transmission towards a certain direction, and extend coverage. For example, beam sweeping may be performed to cover a serving area in a wireless communication system. System information carried on physical broadcast channel (PBCH) may be repeatedly broadcasted towards different directions during the beam sweeping. A mobile device may decode the PBCH in order to obtain the system information or frame timing information.

SUMMARY

Aspects of the disclosure provide a method for PBCH processing at a base station (BS) in a wireless communication system. The method can include performing a channel coding process to generate encoded PBCH data at the BS. The encoded PBCH data is to be carried in a synchronization signal block (SS block) having an SS block index (SBI), and transmitted from a cell having a cell identity (ID). The method can further include performing a second scrambling over the encoded PBCH data with a second scrambling code determined based on the cell ID and the SBI to generate second scrambled PBCH data.

In an embodiment, the method further includes receiving a set of PBCH information bits corresponding to an SS block burst set contained in a half frame having a system frame number (SFN), the SS block burst set including the SS block having the SBI, performing a first scrambling over a subset of the received PBCH information bits with a first scrambling code determined based on the cell ID and the SFN to generate first scrambled PBCH data, and adding a cyclic redundancy check (CRC) to the first scrambled PBCH data to generate a scrambled PBCH payload that is used as an input of the channel coding process to generate the encoded PBCH data.

In an embodiment, the second scrambling code is determined based on the cell ID and a set of least significant bits (LSBs) of the SBI.

In an embodiment, the method further includes generating a sequence including $2^X \cdot M$ bits, where X is a number of the set of LSBs of the SBI, M is a number of bits in the encoded PBCH data, and the sequence include $2^X$ non-overlapping portions each having M bits, and using the X LSBs of the SBI to identify one of the $2^X$ non-overlapping portions to be the second scrambling code.

In an embodiment, the method further includes performing the second scrambling over the encoded PBCH data according to $$\tilde{b}(i) = (b(i) + c(i + vM_{bit})) \bmod 2,$$

where $b(0), \ldots, b(M_{bit}-1)$ are a block of bits in the encoded PBCH data, having a length of $M_{bit}$, $\tilde{b}(0), \ldots, \tilde{b}(M_{bit}-1)$ are a block of scrambled bits in the second scrambled PBCH data having a length of $M_{bit}$, $c(i)$ is a scrambling sequence initialized with the cell ID, and v is the set of LSBs of the SBI.

In an embodiment, the second scrambling code is part of a sequence initialized according to $c_{init} = ((X \text{ LSBs of the SBI}) + 1) \cdot 2^{10} + (\text{the cell ID})$ where $c_{init}$ represents an initial value, and X is a number of LSBs of the SBI.

In an embodiment, the second scrambling code is a part of a Gold sequence initialized by the cell ID. In an embodiment, the second scrambling code is a part of a sequence initialized at the start of the SS block when or before the second scrambling is to take place, or at the start of an SS block burst set when or before a second scrambling for PBCH processing of a first SS block in the SS block burst set is to take place. In an embodiment, the channel coding process includes a rate-matching process.

Aspects of the disclosure provide a method for PBCH processing at a UE in a wireless communication network. The method can include receiving a first SS block carrying a first PBCH from a cell at the UE, the first SS block having a first SBI, the cell having a cell ID, performing a demodulation over the first PBCH to generate first demodulated PBCH data, and performing a descrambling over the first demodulated PBCH data with a scrambling code determined based on the cell ID and the first SBI to generate first descrambled PBCH data.

In an embodiment, the method can further include receiving a second SS block carrying a second PBCH from the cell, the second SS block having a second SS block index (SBI), the first and second SS block belonging to a same SS block burst set, performing a demodulation over the second PBCH to generate second demodulated PBCH data, performing a descrambling over the second demodulated PBCH data with a scrambling code determined based on the cell ID and the second SBI to generate second descrambled PBCH data, and performing a channel decoding process based on a soft-combination of the first and second descrambled PBCH data.

In one example, the scrambling code is a part of a sequence initialized at the start of the first SS block when or before the scrambling is to take place, or at the start of an SS block burst set when or before a scrambling for processing demodulated PBCH data of an SS block positioned at the beginning of the SS block burst set is to take place.

Aspects of the disclosure provide a UE. The UE can include processing circuitry configured to receive a first SS block carrying a first PBCH from a cell in a wireless communication network, the first SS block having a first SBI, the cell having a cell ID, perform a demodulation over the first PBCH to generate first demodulated PBCH data, and perform a descrambling operation over the first demodulated PBCH data with a scrambling code determined based on the cell ID and the first SBI to generate first descrambled PBCH data.

BRIEF DESCRIPTION OF THE DRAWINGS

Various embodiments of this disclosure that are proposed as examples will be described in detail with reference to the following figures, wherein like numerals reference like elements, and wherein:

FIG. 9 shows an example scrambling operation according to an embodiment of the disclosure;

FIG. 10 shows an example of initialization of a Gold sequence for generating a 2nd-scrambling code according to an embodiment of the disclosure;

DETAILED DESCRIPTION OF EMBODIMENTS

Figure 1:
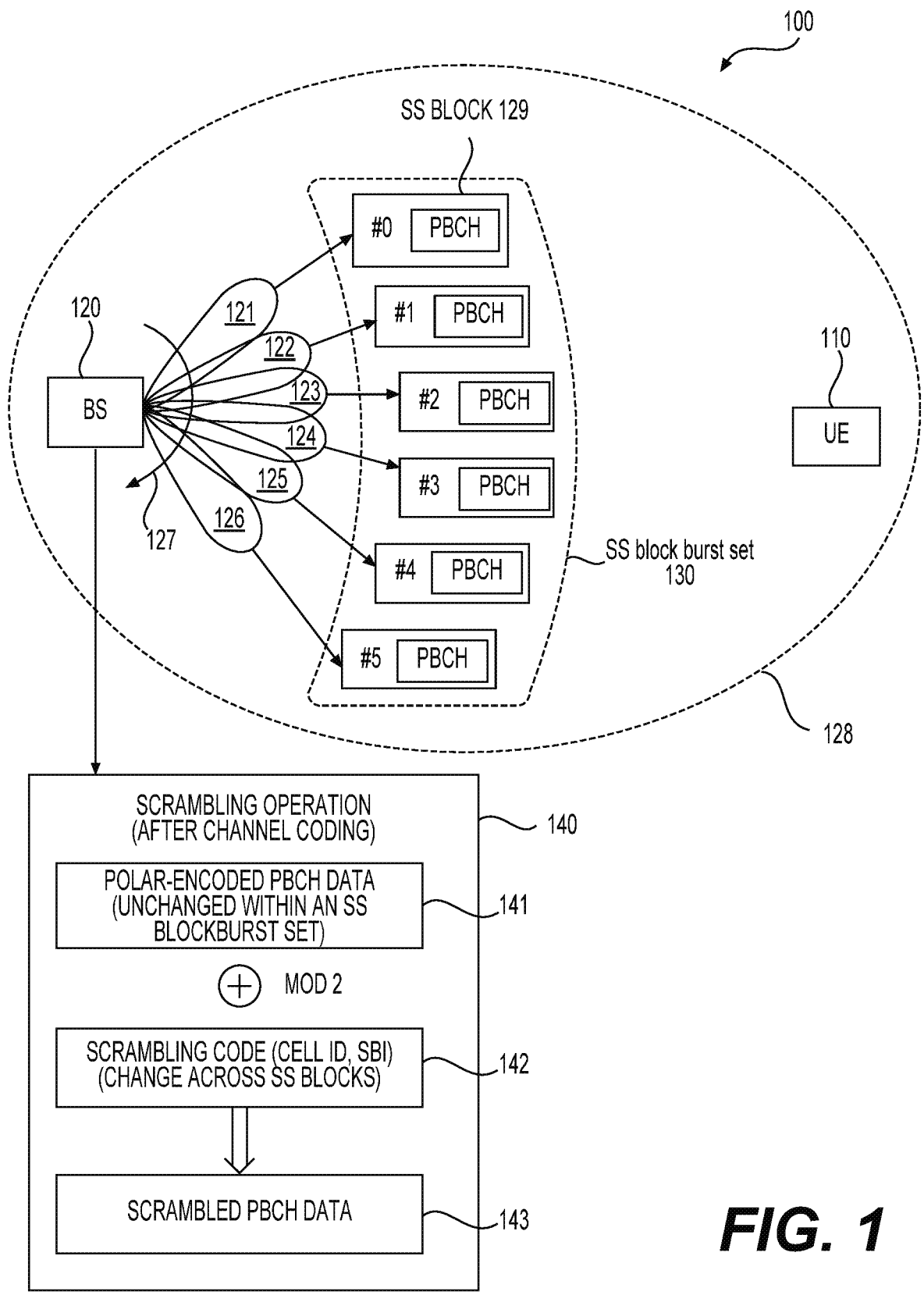
FIG. 1 shows an example wireless communication system according to an embodiment of the disclosure.

FIG. 1 shows an example wireless communication system 100 according to an embodiment of the disclosure. The system 100 includes user equipment (UE) 110 and a base station (BS) 120. The system 100 employs 5th generation (5G) wireless communication technologies developed by the 3rd Generation Partnership Project (3GPP), or other wireless technologies developed by other organizations. The system 100 may include other BSs and UEs that are not shown in FIG. 1.

In some examples, millimeter Wave (mm-Wave) frequency bands and beamforming technologies are employed in the system 100. Accordingly, the UE 110 and the BS 120 can perform beamformed transmission or reception. In beamformed transmission, wireless signal energy can be focused on a specific direction to cover a target serving region. As a result, an increased antenna transmission (Tx) gain can be achieved in contrast to omnidirectional antenna transmission. Similarly, in beamformed reception, wireless signal energy received from a specific direction can be combined to obtain a higher antenna reception (Rx) gain in contrast to omnidirectional antenna reception. The increased Tx or Rx gain can compensate path loss or penetration loss in mm-Wave signal transmission.

The BS 120 can be a base station implementing a gNB node as specified in 5G new radio (NR) air interface standards developed by 3GPP. The BS 120 can be configured to control one or more antenna arrays to form directional Tx or Rx beams for transmitting or receiving wireless signals.

In FIG. 1 example, the BS 120 can control an antenna array to form Tx beams 121-126 to cover a cell 128. The beams 121-126 can be generated towards different directions. The beams 121-126 can be generated simultaneously or in different time intervals in different examples. In one example, the BS 120 is configured to perform a beam sweeping 127 to transmit downlink L1/L2 control channel and/or data channel signals. During the beam sweeping 127, Tx beams 121-126 towards different directions can be successively formed in a time division multiplex (TDM) manner to cover the cell 128. During each time interval for transmission of one of the beams 121-126, a set of L1/L2 control channel data and/or data channel data can be transmitted with the respective Tx beam. The beam sweeping 127 can be performed repeatedly with a certain period.

In alternative examples, the beams 121-126 may be generated in a way other than performing a beam sweeping. For example, multiple beams towards different directions may be generated at a same time. In other examples, one beam may be repeatedly generated towards one direction. The respective beam may have a beam width different from the beams 121-126. Corresponding to different configurations and BS capabilities, the maximum number of beams generated from a BS can be different, such as 4, 8, 64, and the like.

In one example, the beams 121-126 of the cell 128 can be associated with synchronization signal blocks 129 (SS blocks) (also known as SS/PBCH blocks). Each SS block 129 corresponds to a set of resource elements carried on several consecutive orthogonal frequency division multiplexing (OFDM) symbols in an OFDM based system. Each SS block 129 can include a physical broadcast channel (PBCH). The PBCH carries information bits of system information and frame timing information. In some examples, the group of information bits are referred to as a master information block (MIB)). Each SS block 129 may be associated with an SS block index (SBI). The SBI indicates a timing of the respective SS block, thus is also known as an SS block timing index. As shown in FIG. 1, the SS blocks 129 are associated with indexes from #0 to #5.

For example, the BS 120 may periodically transmit a sequence of SS blocks 129 (referred to as an SS block burst set 130). The SS block burst set 130 may be transmitted by performing a beam sweeping 127 as shown in FIG. 1 example. Each SS block 129 of the SS block burst set 130 is transmitted using one of the beams 121-126. The respective SBI indicates a timing or location of each SS block within the SS block burst set 130. In addition, the MIB of the PBCH transmitted within an SS block burst set 130 can be maintained unchanged, for example, for at least a certain number of consecutive SS blocks. In alternative examples, the BS 120 may not employ multiple beams. For example, the BS 120 may transmit to cover the Cell 128 without beamformed transmission. Under such configuration, the SS blocks 129 are successively transmitted in time domain, however, each transmission is performed towards every direction within the cell 128.

The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals.

In one example, the UE 110 performs PBCH decoding based on soft-combination across SS blocks within a same SS block burst set. For example, during an initial access process, the UE 110 decodes the PBCH to obtain the MIB and frame timing information. If a one-shot PBCH decoding is not successful, the UE 110 may try a second PBCH decoding by combining soft bits corresponding to two consecutive PBCH receptions within the SS block burst set 130 to increase the chance of successfully decoding the PBCH.

To facilitate the soft-combination of PBCH decoding across SS blocks within an SS block burst set at the UE 110, the BS 120 can be configured to perform a scrambling operation after a channel coding process. In the scrambling operation, the BS 120 may scramble a same block of encoded PBCH data 141 with a different scrambling code 142 for each PBCH transmission of the SS blocks 129. As a result, different blocks of scrambled PBCH data 143 can be generated for different PBCHs of the SS blocks 129.

For example, for the SS bock burst set 130, the BS 120 may receive the MIB, and generate the encoded PBCH data 141 the channel coding process, for example, with polar codes. As the MIB does not change within the SS block burst set 130, the polar-encoded PBCH data 141 is the same for every PBCH of the SS blocks 129. Then, as shown in FIG. 1, for each PBCH of the SS blocks 129, the UE 110 may perform the scrambling operation 140 over the polar-encoded PBCH data 141 with the scrambling code 142. For example, a modulo-2 addition (or XOR operation) is performed with a pair of bits from the polar-encoded data 141 and the scrambling code 142, respectively. The scrambling code 142 can be determined based on the SBI corresponding to the respective SS block 129, and a cell identity (ID) of the cell 128. Thus, the scrambling code 142 is different across the SS blocks 129.

Figure 2A:
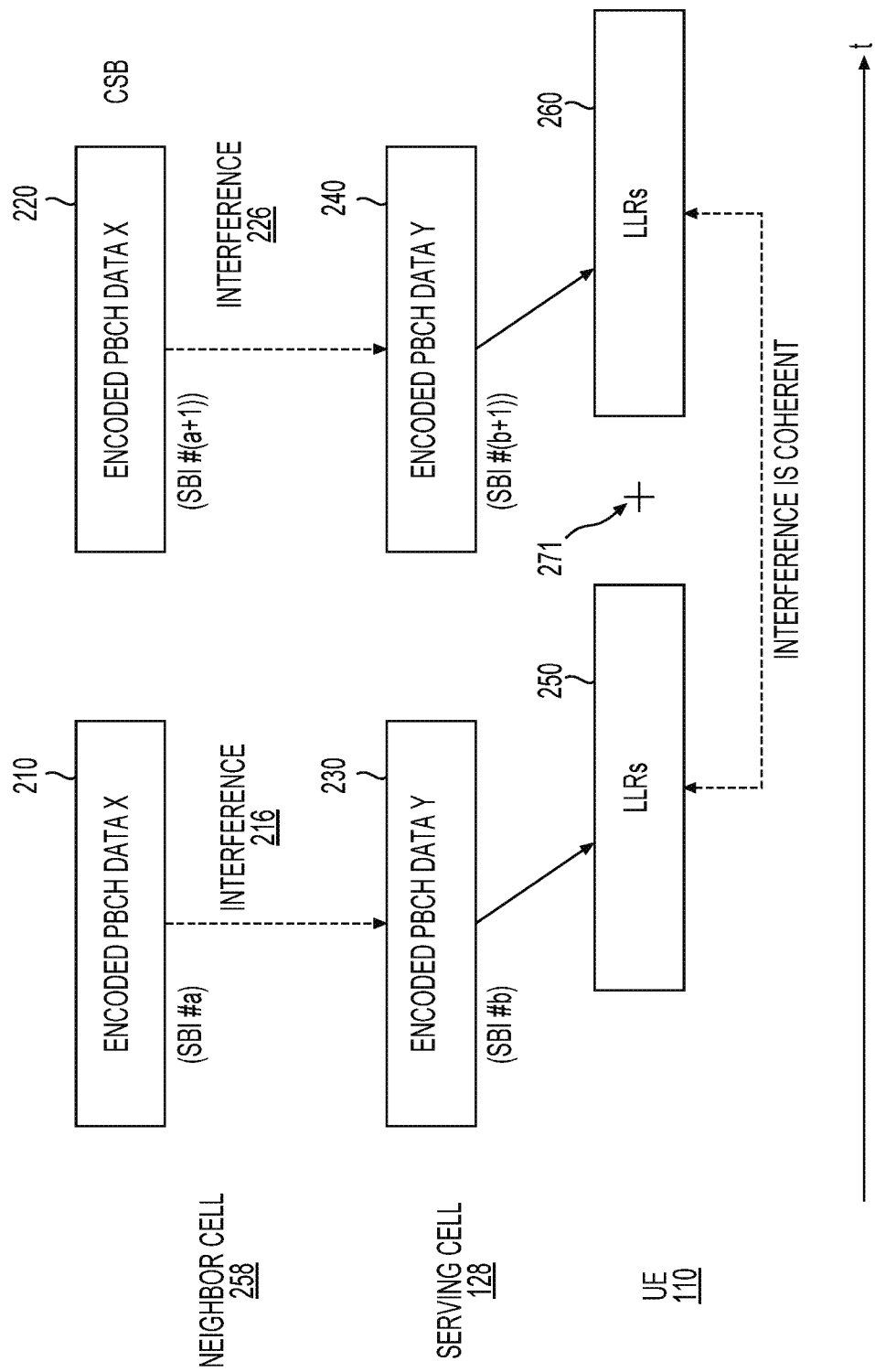
FIG. 2A shows a first PBCH decoding example where no scrambling operation is performed.
Figure 2B:
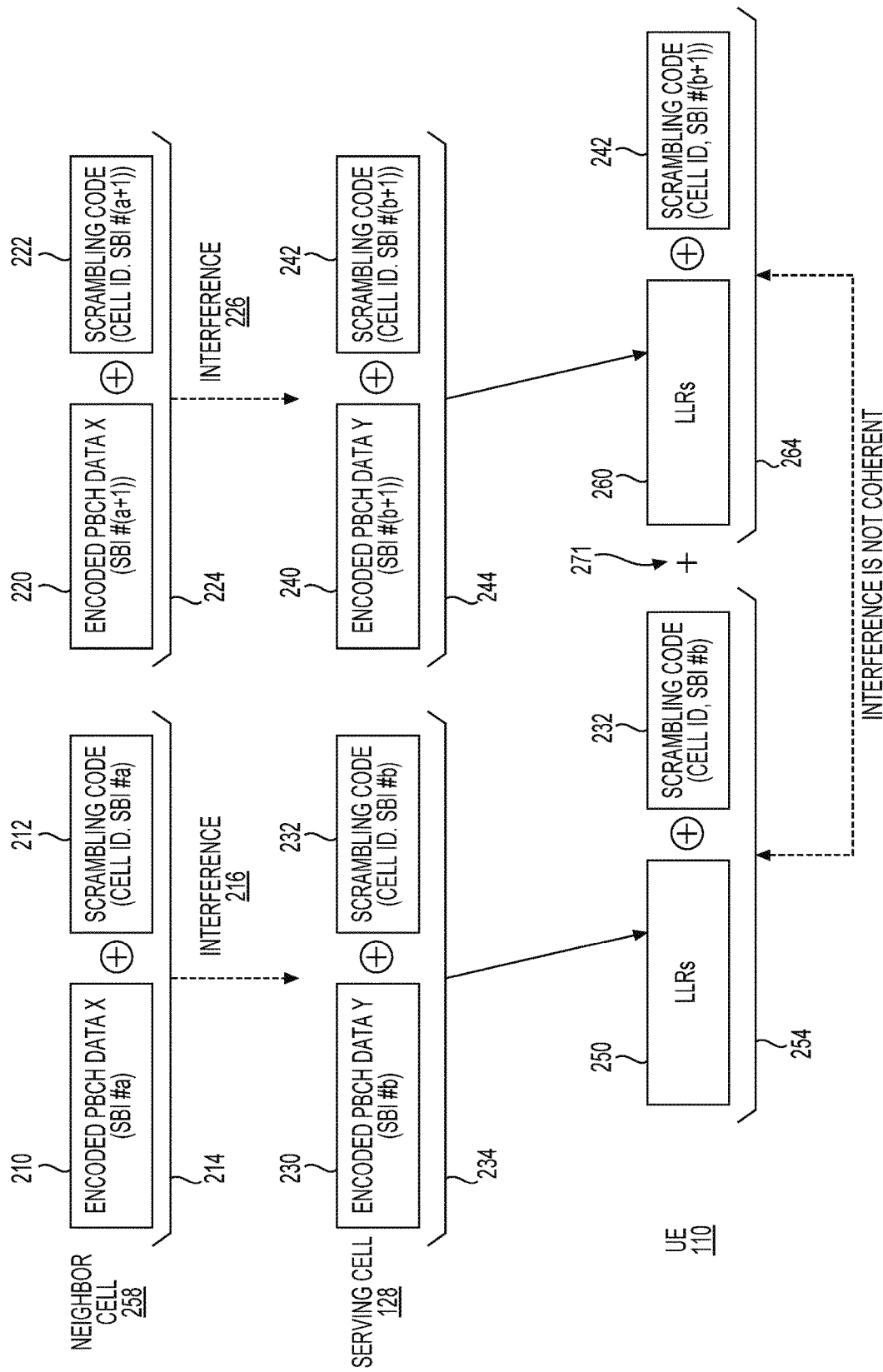
FIG. 2B shows a second PBCH decoding example where the scrambling operation is employed.

Due to the scrambling operation 140 based on the scrambling code 142 that are different across SS blocks 129, performance of the soft-combination PBCH decoding across SS blocks at the UE 110 can be improved. FIGS. 2A and 2B show examples illustrating the improvement. Specifically, FIG. 2A shows a first PBCH decoding example where no scrambling operation 140 is performed, and FIG. 2B shows a second PBCH decoding example where the scrambling operation is employed.

In FIG. 2A, in the serving cell 128, a same block 230 or 240 of encoded PBCH data Y is transmitted twice through two consecutive SS blocks having SBIs #b and #(b+1). In a neighbor cell 258, a same bock 230 or 240 of encoded PBCH data X is similarly transmitted twice through two consecutive SS blocks having SBIs #a and #(a+1). When the SS block transmissions at the serving cell 128 and the neighbor cell 258 are synchronized, because of a same block 210 or 220 is transmitted, interference 216 caused by the block 210 would have similar characteristics as that of interference 226 caused by the block 220. At the UE 110, soft bits 250, for example, in the form of log likelihood ratios (LLRs), derived from a first reception of the block 230 would suffer similar interference as soft bits 260 derived from a second reception of the block 240. Thus, a combination 271 of the two sets of soft bits 250 and 260 would experience coherent interference from the two receptions, which degrades the soft-combination-based PBCH decoding performance.

In FIG. 2B, scrambling operations 214, 224, 234 and 244 similar to the scrambling operation 140 are added for each PBCH transmission. At the serving cell 128, scrambling codes 232 and 242 are employed for the scrambling operations 234 and 244, respectively. At the neighbor cell 258, scrambling codes 212 and 222 are employed for the scrambling operations 214 and 224, respectively. The scrambling codes 212, 222, 232, and 242 can be generated based on respective cell IDs and SBIs. By suitable configurations, the scrambling codes 212, 222, 232, and 242 may have small correlations with each other. As a result, interference 216 and 226 would exhibits different characteristics due to the randomization with different scrambling codes 212 and 222. In addition, the scrambling operations 234 and 244 further randomize the received reference 216 and 226 with different scrambling codes 232 and 242. Thus, coherent of the two parts of interference upon two consecutive receptions of the PBCH data 230 and 240 can be minimized or reduced. At the UE 110, descrambling operations 254 and 264 can first be performed on the soft bits 250 and 260 with the scrambling codes 232 and 242, respectively. For example, a sign or polarity of an LLR value of a soft bit may be inverted when scrambled with a "1", and retained when scrambled with "0". Soft-combination 271 of the two sets of soft bits can then be performed. Compared with the FIG. 2B example, the PBCH decoding performance can be improved.

Figure 3:
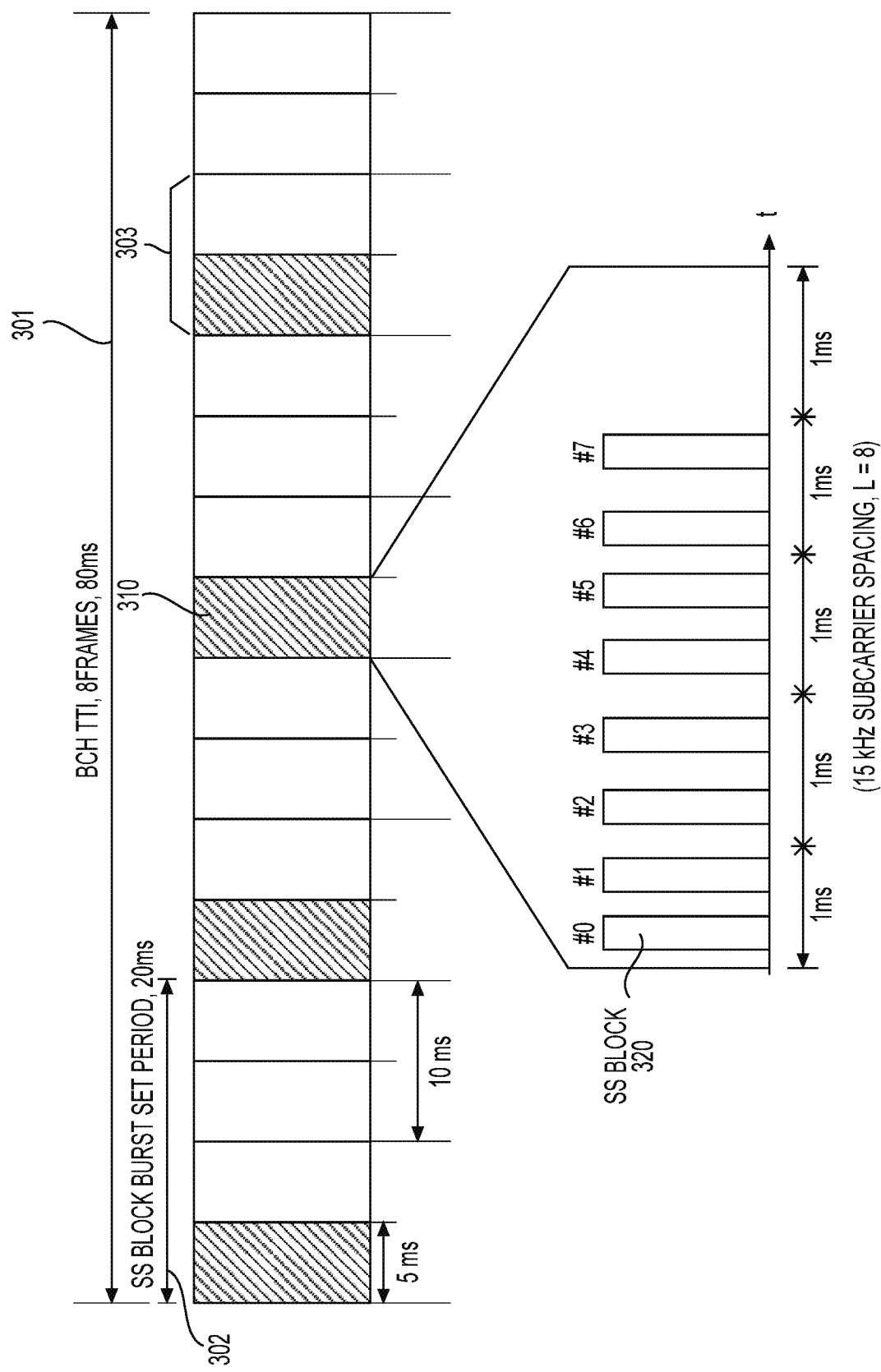
FIG. 3 shows an example of synchronization signal block (SS block) transmission configuration according to an embodiment of the disclosure.

FIG. 3 shows an example of SS block transmission configuration according to an embodiment of the disclosure. A sequence of 8 frames 303 is shown which corresponds to a broadcast channel (BCH) transmission time interval (TTI) 301. The BCH TTI has duration of 80 ms. A sequence of SS block burst sets 310 are transmitted among the frames 303 with a period 302 of 20 ms. In various examples, the SS block burst set transmission period can be 5, 10, 20, 40, 80, 160 ms, and the like. Each SS block burst set 310 is contained in a half-frame time window (5 ms). Depending on the configuration, the half-frame time window may be a first or a second half frame.

Each SS block burst set 310 may include a sequence of SS blocks 320 each associated with an SBI. Depending on different subcarrier spacing (numerology) configurations, numbers and locations (timings) of SS blocks within an SS block burst set 310 can be different. For example, a maximum number L of candidate SS block locations can be 4, 8, or 64 in different configurations. Accordingly, SBIs can be represented with 2, 3 or 6 bits. FIG. 3 shows an example of the SS block burst set configuration corresponding to 15 kHz subcarrier spacing and 8 SS block candidate locations. Eight SS blocks are transmitted on the eight candidate locations, and have SBIs of #0-#7.

Figure 4:
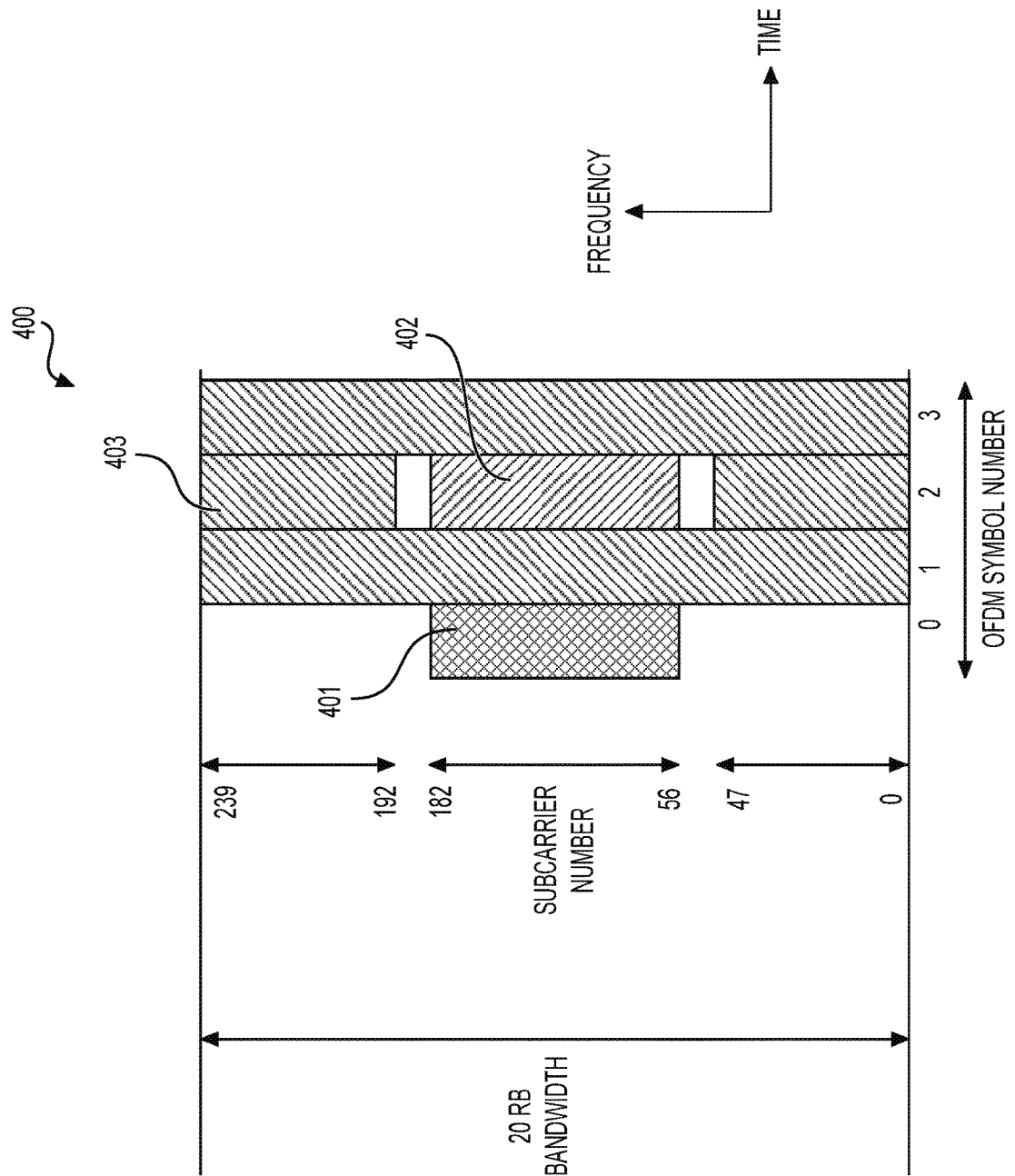
FIG. 4 shows an example SS block according to an example of the disclosure.

FIG. 4 shows an example SS block 400 according to an example of the disclosure. The SS block 400 can include a primary synchronization signal (PSS) 401, a secondary synchronization signal (SSS) 402, and a PBCH 403 (represented with shaded areas designated with numbers of 401, 402, and 403, respectively). Those signals can be carried in REs on a time-frequency resource grid as shown in FIG. 4. In addition, the SS block 400 can carry demodulation reference signals (DMRSs) (not shown) in a subset of REs in the shaded area 403. The REs carrying DMRSs are not used for carrying PBCH signals in one example.

In one example, the SS block 400 can be distributed over 4 OFDM symbols in time domain and occupy a 20 resource block (RB) bandwidth in frequency domain. As shown in FIG. 4, the 4 OFDM symbols are numbered from 0 to 3, while the 20-RB bandwidth includes 240 subcarriers numbered from 0 to 239. Specifically, the PSS 401 can occupy REs at symbol 0 and subcarriers 56-182. The SSS 402 can occupy REs at symbol 2 and subcarriers 56-182. The PBCH 403 can be located at symbols 1-3 occupying 20 RBs at symbols 1 and 3, and 8 RBs (96 subcarriers) at symbol 2.

In one example, the SS block 400 is configured to carry bits of an SBI by using the DMRSs and the PBCH 403. For example, for an SBI with a maximum of 6 bits, 3 least significant bits (LSBs) of the SBI is carried by the DMRSs and 3 most significant bits (MSBs) of the SBI is carried by the PBCH 403. In one example, by decoding the PSS 401 and the SSS 402, a physical layer cell identification (ID) can be determined. The cell ID indicates which cell the SS block 400 is associated with.

Figure 5:
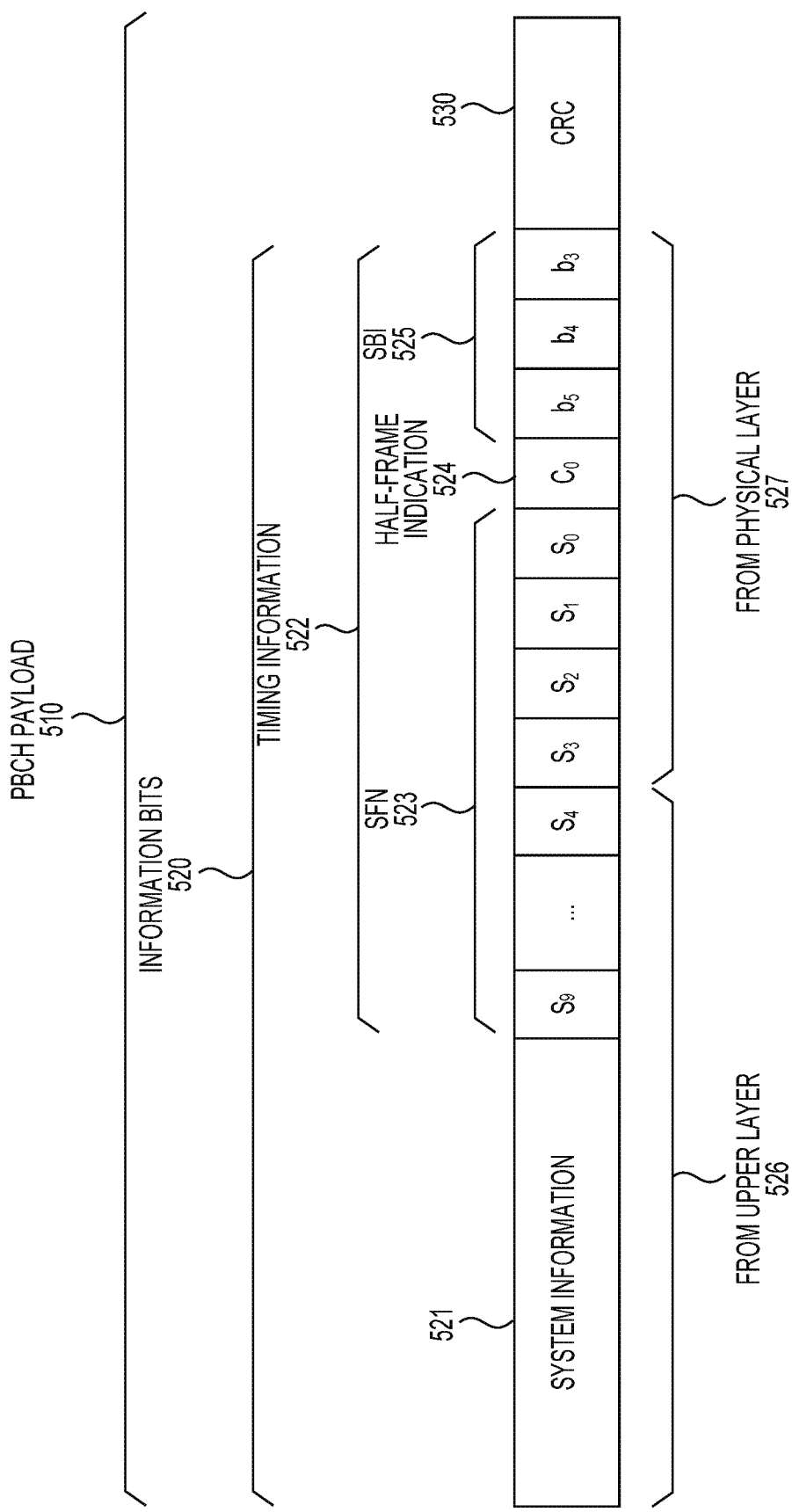
FIG. 5 shows an example of a PBCH payload according to an embodiment of the disclosure.

FIG. 5 shows an example of a PBCH payload 510 according to an embodiment of the disclosure. The PBCH payload 510 can include information bits 520 and cyclic redundancy check (CRC) bits. The information bits 520 can include system information 521 and timing information 522. The timing information 522 can include system information number (SFN) 523, half-frame indication bit 524, MSB bits of SBI 525. In addition, a first part 526 of the information bits 520 can be received from a transport layer, and a second part 527 of the information bits 520 can be generated at a physical layer. For example, the transport layer and the physical layer are the layers of a protocol stack of the system 100 that is specified in 3GPP 5G standards.

For each transmission of an SS block, a PBCH payload can be formulated at the physical layer. The bits received from upper layer 526 do not change within a BCH TTI. The SFN bits S0-S3 and the half-frame indication bit C0 do not change for each SS block burst set which is contained within a half frame.

The MSB bits of SBI do not change for 8 consecutive SS blocks within an SS block burst set. In one example, possible numbers (L) of SS blocks within an SS block burst set is configured to be one of 4, 8, or 64. When L=64, the three MSB bits of respective SBI is included in PBCH payload. Thus, the PBCH payload maintains unchanged for at least such a group of 8 consecutive SS blocks. Accordingly, the PBCH payload can be decoded at the UE 110 based on a soft-combination of PBCHs of two consecutive SS blocks belonging to such a group of 8 consecutive SS blocks.

For L=4, or 8, the three LSB bits of respective SBI is carried in DMRSs of respective PBCH. No SBI bits are included in PBCH payload. Accordingly, for L=4 or 8, the respective PBCH payload will not change within an SS block burst set, and soft-combination across SS blocks within an SS block burst set can accordingly be performed.

Figure 6:
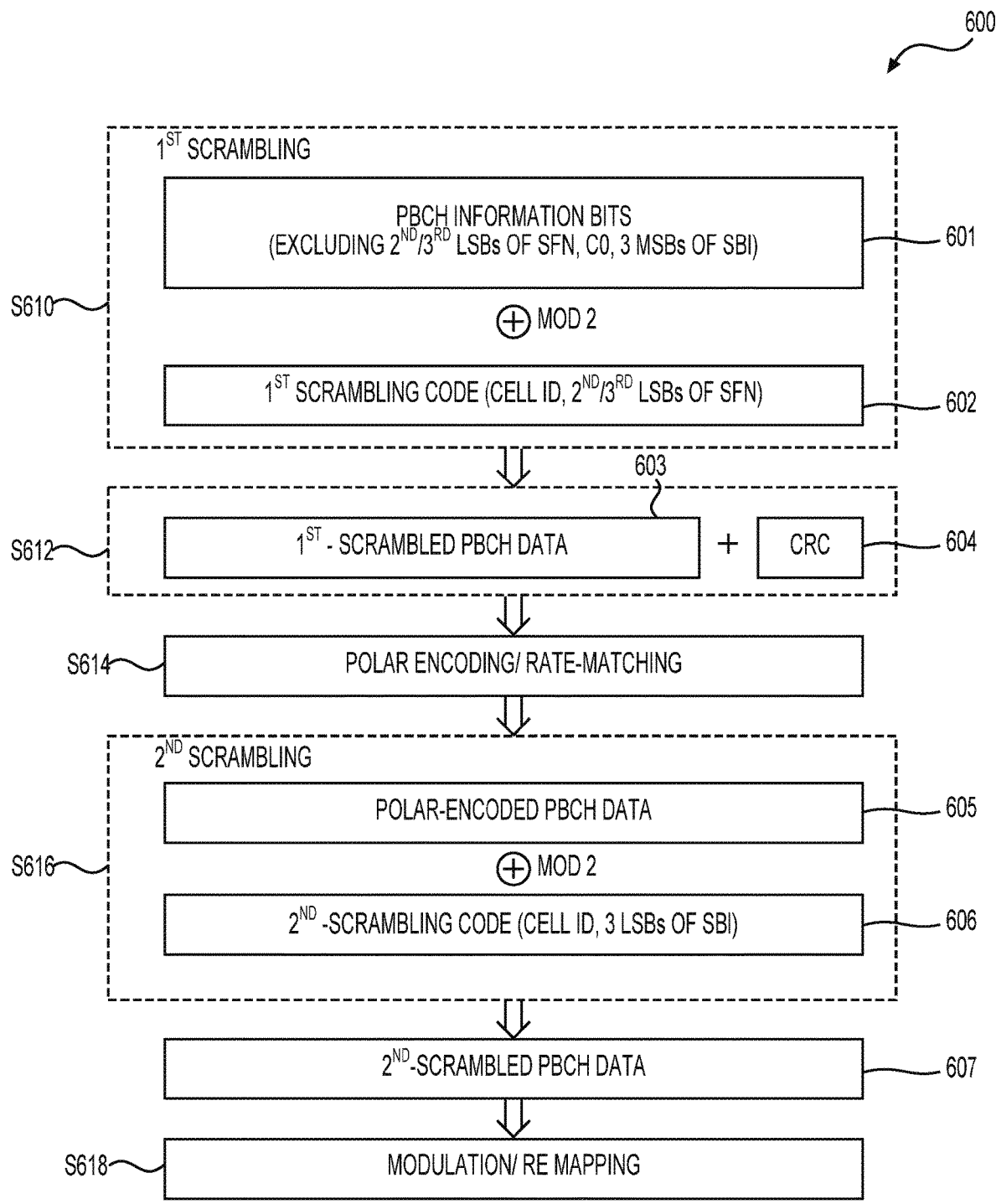
FIG. 6 shows an example process for PBCH processing according to embodiments of the disclosure.

FIG. 6 shows an example process 600 for PBCH processing according to embodiments of the disclosure. The process 600 can be performed at the BS 120 to generate an SS block carrying PBCH data. The system 100 and the PBCH payload 510 are used for explanation of the process 600. In the process 600, a scrambling operation is performed over polar-encoded PBCH data with a scrambling code based on a cell ID and an SBI.

At S610, a first scrambling operation is performed. For example, the information bits 520 can be generated as described in FIG. 5 example. A subset 601 of the information bits 520 are scrambled with a first scrambling code 602. The subset 601 of the information bits 520 do not include the 2nd and 3rd LSB (bit S1 and S2) of the SFN 523, the half-frame timing indication bit C0, and the 3 MSB of SBI of the PBCH payload 510. The first scrambling code 602 is determined based on the cell ID of the cell 128 and the 2nd and 3rd LSB (bit S1 and S2) of the SFN 523 in FIG. 5. Scrambled bits resulting from the first scrambling operation are combined with the non-scrambled bits of the PBCH payload 510 to form 1st-scrambled PBCH data 603. An interleaving operation may additionally be performed over the information bits before the 1st scrambling operation.

At S612, the 1st-scrambled PBCH data 603 is attached with a CRC 604 to form a scrambled PBCH payload including scrambled information bits.

At S614, channel coding (e.g., with polar codes) and rate matching operations can be performed over the scrambled PBCH payload to generate polar-encoded PBCH data 605. In one example, the channel coding and rate matching operations is part of a channel coding process. The encoded PBCH data 605 is a result of the channel coding process. In other examples, the rate matching operations may not be performed.

As an example, 3GPP standards TS38.212 describes operations of payload generation, 1st scrambling, CRC attachment, channel coding, and rate matching.

At S616, a 2nd scrambling operation is performed over the polar-encoded PBCH data 605 with a 2nd scrambling code 606. Generally, the 2nd scrambling code 606 is used to vary interference from neighbor cells across SS blocks such that soft-combination for decoding PBCH may have a better performance. To serve this purpose, the 2nd scrambling code changes from SS block to SS block. Various ways may be adopted in different examples to generate such a 2nd scrambling code. In one example, the 2nd scrambling code 606 is generated based on the cell ID and 3 LSB of the respective SBI. With this method, at least 8 different scrambling codes can be generated. As a result of the 2nd scrambling operation, 2nd-scrambled PBCH data 607 is generated.

At S618, the 2nd-scrambled PBCH data 607 is transmitted to the UE 110. For example, modulation and RE mapping are performed to carry the PBCH data in the respective SS block.

Figure 7:
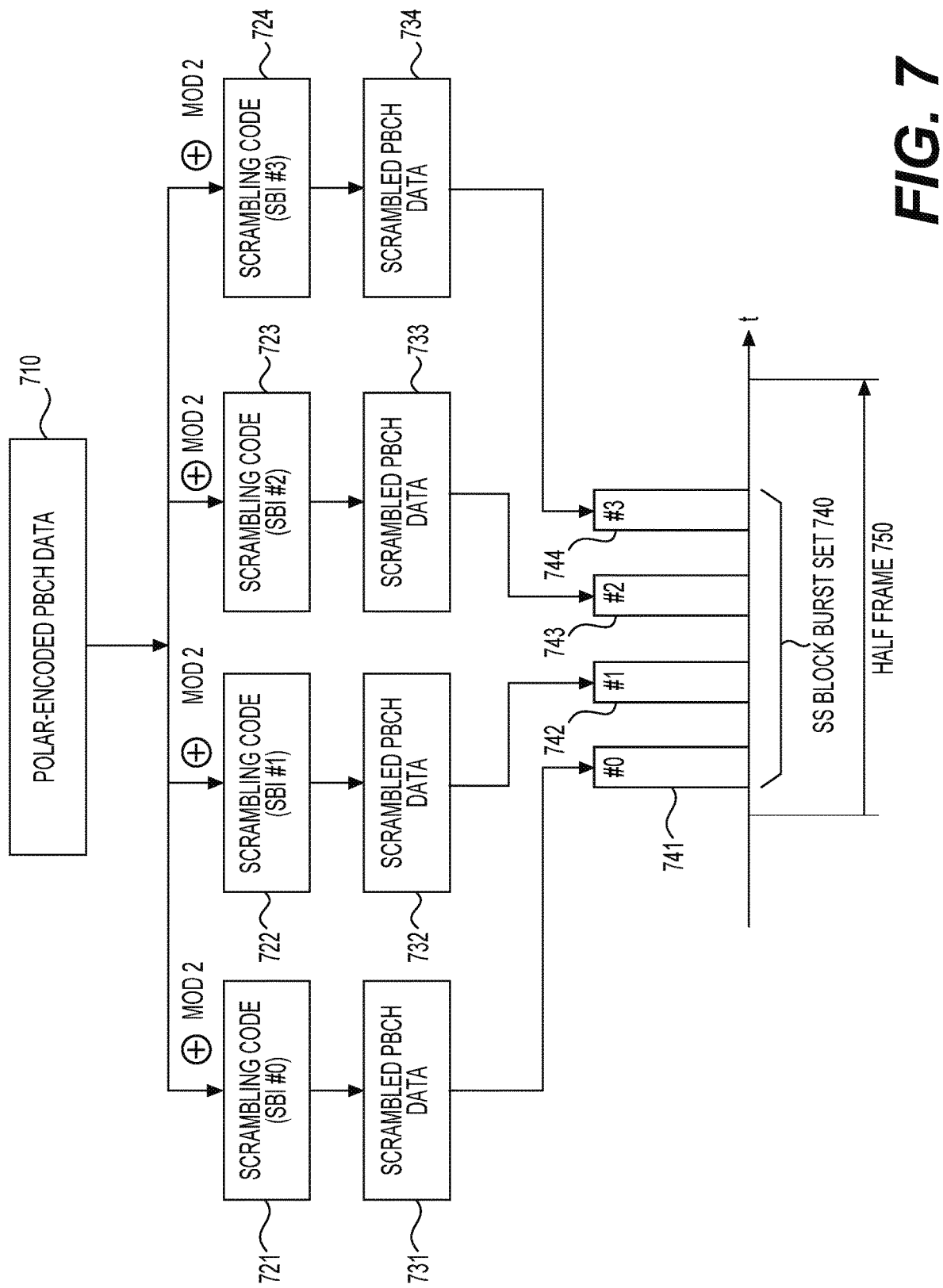
FIG. 7 shows an example of mapping polar-encoded PBCH data to SS blocks within an SS block burst set according to an embodiment of the disclosure.

FIG. 7 shows an example of mapping polar-encoded PBCH data 710 to SS blocks 741-744 within an SS block burst set 740 according to an embodiment of the disclosure. As shown, the SS block burst set 740 is contained in a half frame 750. A PBCH payload corresponding to the SS block burst set 740 will not change across the SS blocks 741-744. The PBCH payload is used to generate the polar-encoded data 710.

A sequence of scrambling code 721-724 can be generated. The scrambling code 721-724 are different from each other, and are each determined based on a respective SBI of the SS blocks 741-742, such as #0, #1, #2, or #3, as well as the respective cell ID. The polar-encoded data 710 is scrambled with the sequence of scrambling code 721-724 as shown in FIG. 7 to generate a sequence of scrambled PBCH data 731-734. The scrambled PBCH data 731-734 is then processed to be carried in the sequence of SS blocks 741-744, respectively.

Figure 8:
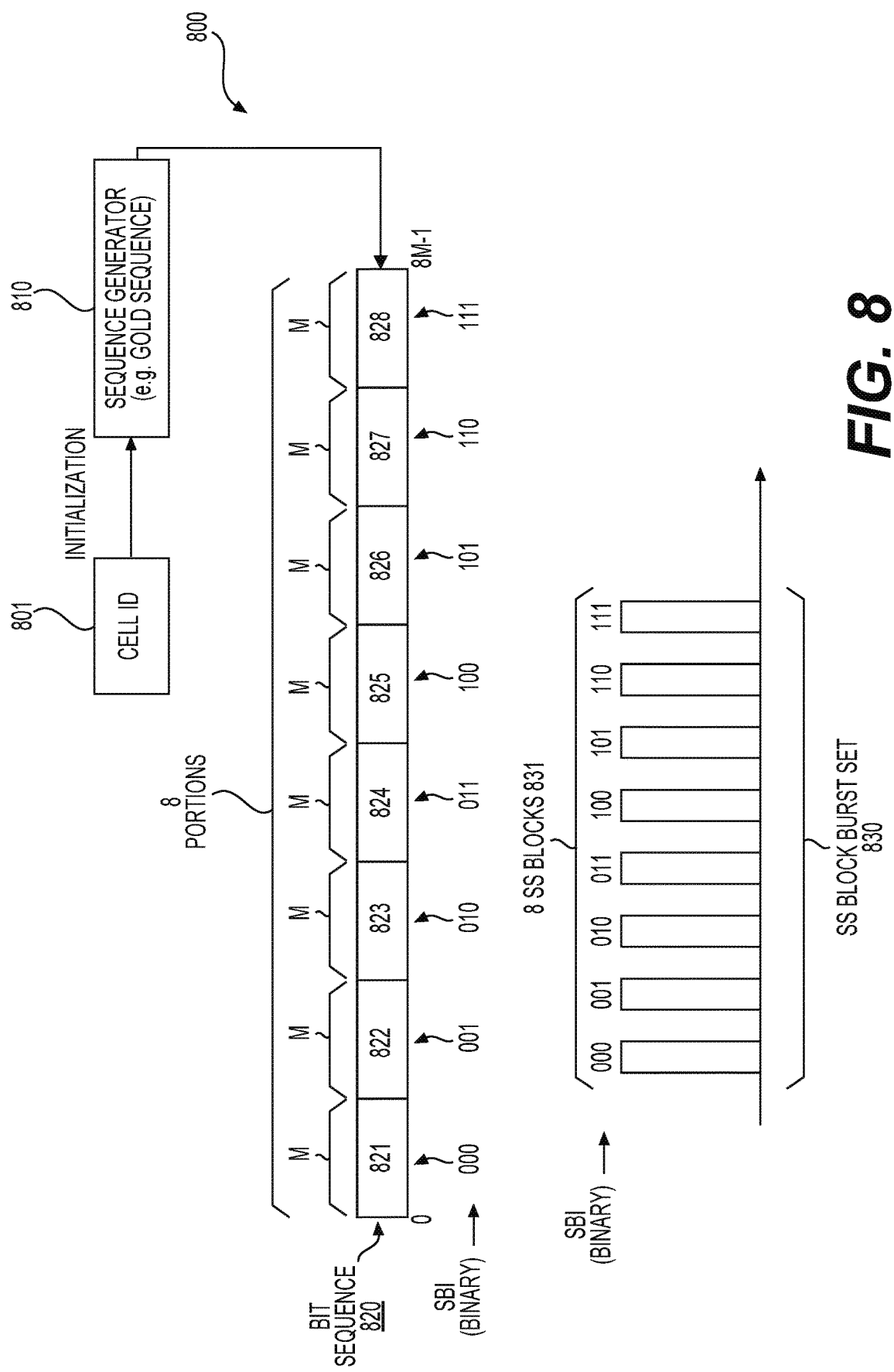
FIG. 8 shows an example of generating scrambling codes for the 2nd scrambling operation as described in the FIG. 6 example.

FIG. 8 shows an example of generating scrambling codes 821-828 for the 2nd scrambling operation S616 as described in the FIG. 6 example. The scrambling codes 821-828 are to be used for scrambling polar-encoded PBCH data of an SS block burst set 830. The SS block burst set 830 include a sequence of SS blocks 831 having SBIs from 000 to 111 (binary). Thus, each scrambling code 821-828 corresponds to an SBI that is one of 000-111. The number of scrambling codes 821-828 equals the number of the SS blocks 831, taking a value of 8. The number of bits in the polar-encoded PBCH data is represented as M. Thus, each scrambling code 821-828 can have a length of M bits. Please note that 8 portions in FIG. 8 is for illustration only. In other embodiments, 4 portions may be utilized.

In FIG. 8 example, in order to obtain the scrambling codes 821-828, a sequence generator 810 is employed to generate a bit sequence 820. In one example, the sequence 820 is a pseudo-random sequence, such as a Gold sequence. Before the generation, the sequence generator 810 can first be initialized with a cell ID 801 corresponding to a cell from which the SS blocks 831 are transmitted. The length of the sequence 820 can be determined according to the number of the SS blocks 831 and the number of bits M in the polar-encoded PBCH data. As shown, after the sequence 820 is generated, the sequence 820 can then be partitioned into 8 portions each corresponding to an SBI of the SS blocks 831.

Based on the FIG. 8 example, a more general process for generating scrambling codes for the 2nd scrambling operation in S616 as describe in the FIG. 6 example is described below. First, the sequence generator is initialized with the cell ID. Then, a sequence of length $(2^X)*M$ is generated where X is the number of LSB bits of SBIs of a sequence of SS blocks within an SS block burst set. Thereafter, the generated sequence is partitioned into a sequence of $2^X$ non-overlapping portions. Subsequently, one of the non-overlapping portions is identified by using X LSB bits of an SBI of an SS block for generating scrambled PBCH data corresponding to the SS block having the SBI.

For example, when the SS block burst set 830 is configured with 4 SS blocks, X can take a value of 2. When the SS block burst set 830 is configured with more than 4 SS blocks, X can take a value of 3. Corresponding to different SS block number configurations, different number (4 or 8) of non-overlapping portions can be obtained by generating the sequence 820 with a different length.

In one example, the sequence generator 810 is initialized at the start of the SS block burst set 830 (in other words, when or before the 2nd-scrambling operation is to take place for the first SS block in the SS block burst set 830). The bit sequence 820 is generated and stored in a memory. The portions of the bit sequence 820 is subsequently identified and used for each SS block 831 (PBCH in each SS block 831). Alternatively, the bit sequence 820 is generated portion by portion. Each portion of the bit sequence 820 can be generated when processing of each SS block 831 (PBCH in each SS block 831) starts.

In one example, at the start of PBCH processing of each SS block 831 (in other words, when or before the respective 2nd-scrambling operation is to take place for each SS block 831), the sequence generator 810 is initialized, and the sequence 820 is generated. A portion of the sequence 820 is then identified based on the SBI of the currently-being processed SS block.

In one example, a pseudo-random sequence generated from the sequence generator 810 is defined by a length-31 Gold sequence. For example, the output pseudo-random sequence of the sequence generator 810 can be represented as c(n), where n is the bit index starting from 0 and increasing by 1 until a length of the sequence 820 minus 1 (e.g., 8M-1 in FIG. 8). The sequence 820 can be defined by $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

In the above expressions, $N_C=1600$, and the first m-sequence $x_1(n)$ can be initialized with $x_1(0)=1$, $x_1(n)=0$ for n=1, 2, . . . , 30. An initialization value of the second m-sequence, $x_2(n)$, is denoted by $c_{init}=\Sigma_{i=0}^{30} x_2(i) \cdot 2^i$. The value of $c_{init}$ can be different and depend on the application of the output sequence. As in the FIG. 8 example, $c_{init}$ takes the value of the cell ID.

FIG. 9 shows an example scrambling operation 900 according to an embodiment of the disclosure. The scrambling operation 900 corresponds to the second scrambling operation performed at S616 in FIG. 6 example. The polar-encoded PBCH data in FIG. 6 is represented as a block of bits b(0), . . . , $b(M_{bit}-1)$, where $M_{bit}$ is the number of bits transmitted on the respective PBCH (PBCH payload length). The block of bits b(0), . . . , $b(M_{bit}-1)$ are scrambled prior to modulation, resulting in a block of scrambled bits $\tilde{b}(0), \ldots, \tilde{b}(M_{bit}-1)$ that is the 2nd-scrambled PBCH data 607 in FIG. 6 example. The scrambling can be performed according to $$\tilde{b}(i)=(b(i)+c(i+vM_{bit})) \bmod 2,$$

where is a bit sequence, such as a length-31 Gold sequence. The bit sequence can be initialized with the respective cell ID, for example, at the start of the respective SS block burst set or at the start of the respective SS block (similar to the initial initialization timing described in FIG. 8 example). For an SS block burst set configured with 4 SS blocks, v is the two LSBs of the respective SSI. For an SS block burst set configured with 8 or 64 SS blocks, v is the three LSBs of the SBI.

FIG. 10 shows an example of initialization of a Gold sequence for generating a 2nd-scrambling code according to an embodiment of the disclosure. The 2nd-scrambling code can be used for scrambling a polar-encoded PBCH data for a PBCH carried in an SS block. As shown, an initialization value $c_{init\_1}$ can be defined according to $$c_{init\_1}=(SBI+1)*2^{10}+N_{ID}^{cell},$$

where SBI represents 2 or 3 LSBs of an SBI of the SS block, and $N_{ID}^{cell}$ represents a cell ID of a cell from which the PBCH is transmitted. For PBCH processing of a sequence of SS blocks in an SS block burst set, the initialization of the Gold sequence according to the above definition can be performed for each PBCH of the sequence of SS blocks (when or before the respective 2nd-scrambling operation is to take place). In contrast, in FIG. 8 and FIG. 9 example, the initialization can be performed at the beginning of the respective SS block burst set, or at the beginning of the respective SS block, depending on respective configurations.

Figure 11:
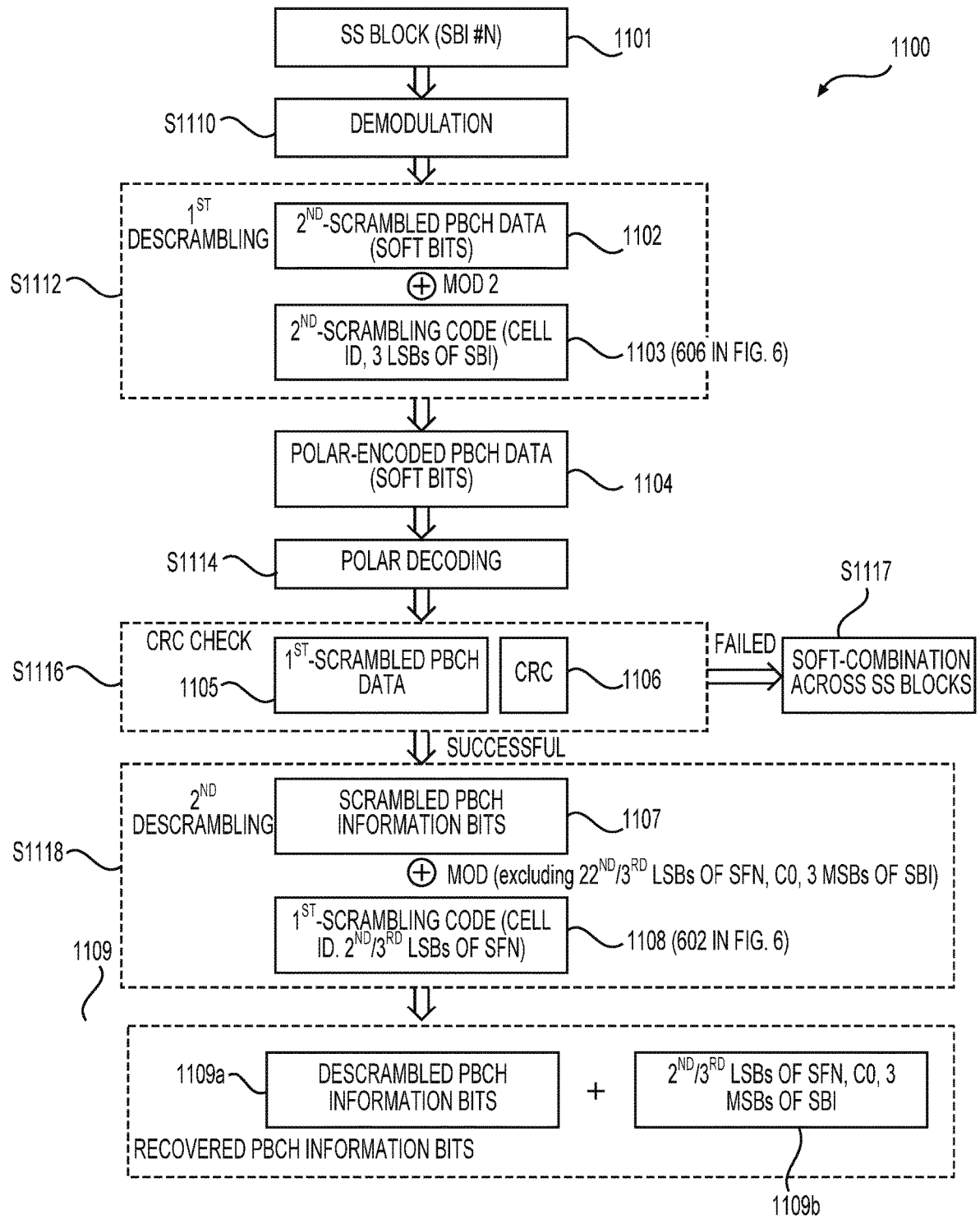
FIG. 11 shows a PBCH detection process according to an embodiment of the disclosure.

FIG. 11 shows a PBCH detection process 1100 according to an embodiment of the disclosure. The process 1100 can be an inverted process of the PBCH processing process 600 in FIG. 6. The process 1100 thus is explained with comparison to the process 600. The process 1100 can be performed at the UE 110. The system 100 is used as an example for explanation of the process 1100.

At S1110, a demodulation of a PBCH can be performed based on a received signal carrying an SS block 1101. The SS block 1101 may have an SBI of #N. The SS block 1101 can include a PSS, an SSS, the PBCH, and DMRSs. For example, synchronization may first be performed based on the PSS and SSS, and a cell ID can be obtained by decoding the PSS and SSS. Subsequently, the DMRSs can be decoded, and the 3 LSBs of the SBI #N can accordingly be obtained. Subsequently, the demodulation can be performed over the PBCH.

As a result of the demodulation, 2nd-scrambled PBCH data 1102 (corresponding to the 2nd-scrambled PBCH data 607) can be recovered. In FIG. 11 example, soft bits (e.g., in the form of LLRs) can be calculated, for example, based on channel estimation results and a modulation scheme employed. In alternative examples, hard bits may be used in place of the soft bits for the PBCH detection.

At S1112, a 1st descrambling operation (corresponding to the 2nd scrambling operation S616) can be performed. For example, before the 1st descrambling operation, with knowledge of the 3 LSBs of the SBI #N and the cell ID, a 2nd-scrambling code 1103 can be generated in a same manner as the 2nd-scrambling code 606 in FIG. 6, or in examples of FIGS. 8-10. Thus, the 2nd-scrambling code 1103 can be the same as the 2nd-scrambling code 606. As a result of the 1st descrambling operation, polar-encoded PBCH data 1104 (corresponding to the polar-encoded PBCH data 605) can be recovered. The polar-encoded PBCH data 1104 can be a set of soft bits.

At S1114, a polar decoding process can be performed with the polar-encoded PBCH data 1104 as input. As a result, 1st-scrambled PBCH data 1105 (corresponding to the 1st-scrambled PBCH data 603) and a CRC 1106 in the form of hard bits can be generated.

At S1116, a CRC check can be performed to verify whether the 1st-scrambled PBCH data 1105 is decoded correctly. When the CRC check is failed, the process 1100 proceeds to S1117 where a PBCH detection based on soft-combination across SS blocks may be performed. Otherwise, the process 1100 may proceed to S1118.

At S1118, a 2nd descrambling (corresponding to the 1st scrambling at S610) is performed. Specifically, scrambled PBCH information bits 1107 as a part of the 1st-scrambled PBCH data 1105 is descrambled with a 1st-scrambling code 1108 to generate descrambled PBCH information bits 1109a (corresponding to the PBCH information bits 601). The 1st-scrambling code 1108 can be the same as the 1st-scrambling code 602 in FIG. 6, and can be generated in a same manner as the 1st-scrambling code 602.

For example, in addition to the scrambled PBCH information bits 1107, the 1st-scrambled PBCH data 1105 further includes a set 1109b of bits: 2nd/3nd LSBs of SFN, C0, 3 MSBs of SBI (assuming more than 4 SS blocks in a respective SS block burst set). The set 1109b of bits are not scrambled at S610, thus are detected before the 2nd descrambling. With the knowledge of the 2nd/3rd LSBs of SFN and the cell ID, the 1st-scrambling code 1108 can be generated.

Finally, the descrambled PBCH information bits 1109a can be merged with the set 1109b of bits to form recovered PBCH information bits 1109. Additionally, a de-interleaving may be performed to adjust an order of the recovered PBCH information bits 1109, which corresponds to the interleaving operation performed in FIG. 6 example.

Figure 12:
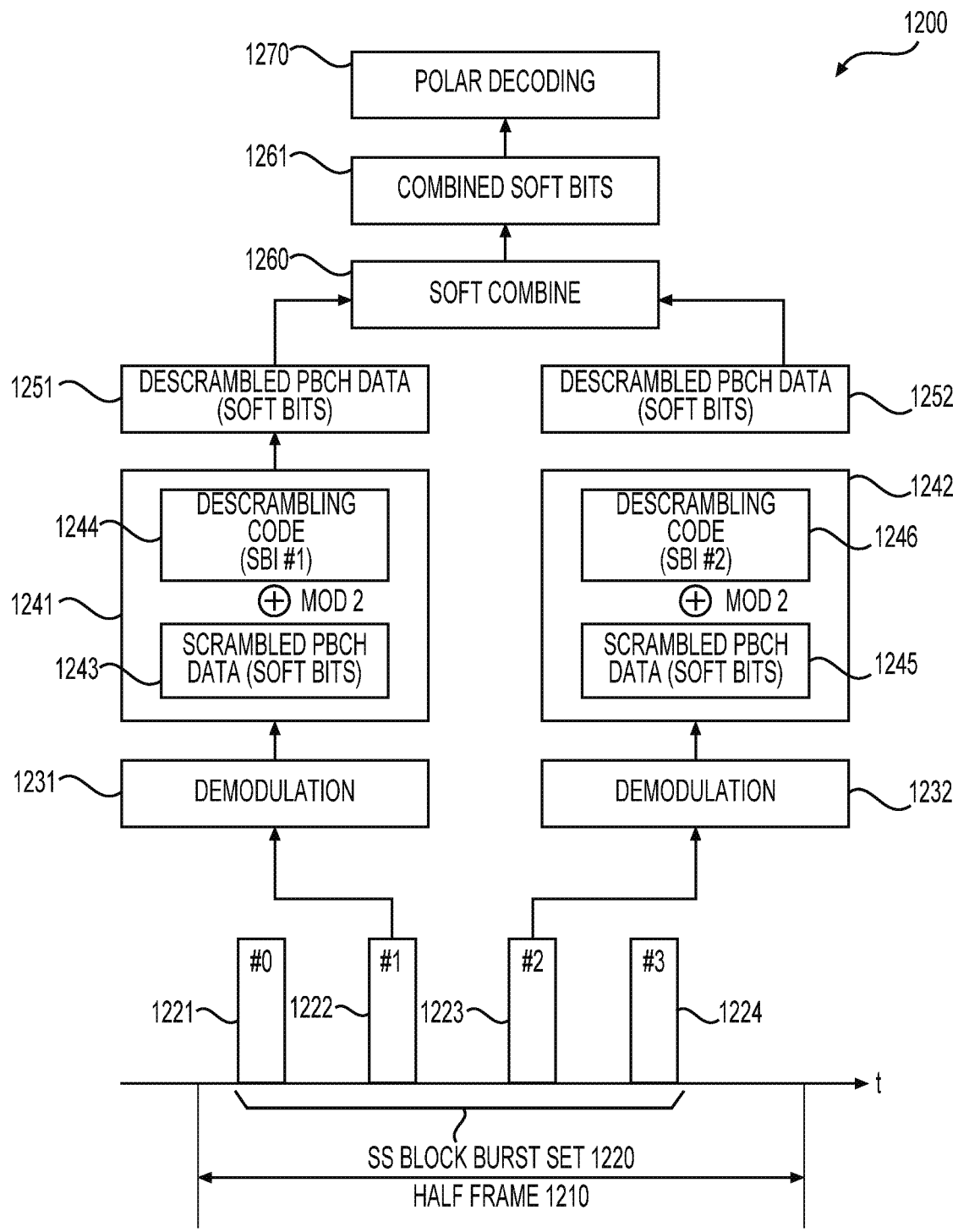
FIG. 12 shows an example process for PBCH detection based on soft-combination across SS blocks within an SS block burst set according to an embodiment of the disclosure.

FIG. 12 shows an example process 1200 for PBCH detection based on soft-combination across SS blocks 1221-1224 within an SS block burst set 1220. The process 1200 can be performed at the UE 110, and the system 100 is used as an example for explanation of the process 1200. As shown, the SS block burst set 1220 is contained within a half frame 1210. Accordingly, a same PBCH payload is carried in PBCH of each of the SS blocks 1221-1224.

The UE 110 can first try to perform a one-shot PBCH decoding to acquire system information and timing information over the SS block 1222. For example, a demodulation 1231 can first be performed resulting in scrambled PBCH data 1243 in the form of soft bits, which is followed by a descrambling operation 1241. The descrambling operation 1241 is similar to the descrambling operation at S1112 in FIG. 11 example. Particularly, a descrambling (or scrambling) code 1244 can be determined based on an SBI #1 of the SS block 1222. Soft bits of descrambled PBCH data 1251 can thus be obtained and stored in a memory.

When the one-shot PBCH decoding is failed, the UE 110 can start to detect the PBCH based on soft combination. Specifically, a demodulation 1232 can first be performed resulting in scrambled PBCH data 1245 in the form of soft bits, which is followed by a descrambling operation 1242. The descrambling operation 1242 is similar to the descrambling operation at S1112 in FIG. 11 example. Particularly, a descrambling (scrambling) code 1246 can be determined based on an SBI #2 of the SS block 1223. Soft bits of descrambled PBCH data 1252 can thus be obtained.

The UE 110 may then perform a soft combination 1260 upon the two sets of soft bits 1251 and 1252, for example, by adding LLRs from the two sets bit by bit, to generate a set 1261 of combined soft bits. The combined soft bits 1261 can then be fed to a polar encoder to conduct a polar decoding operation 1270. A CRC check can then be used to verify if the PBCH detection is successful. When the CRC check is failed, the UE 110 may try to obtain a third set of soft bits by processing PBCH of the SS block 1224, and combine the three sets of soft bits across the SS blocks to decode the PBCH.

Figure 13A:
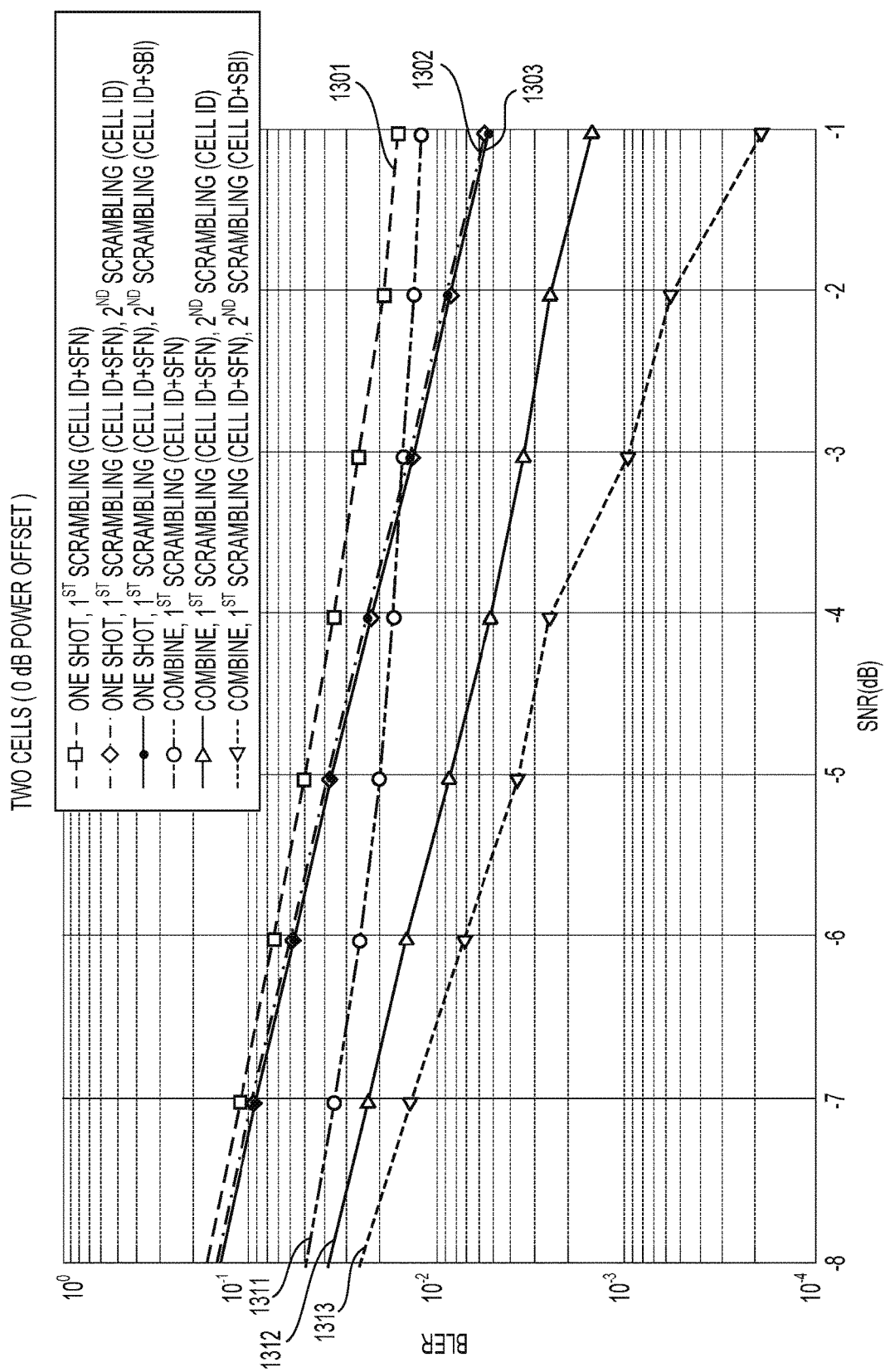
FIGS. 13A-13B show simulation results of PBCH processing with different scrambling configurations.
Figure 13B:
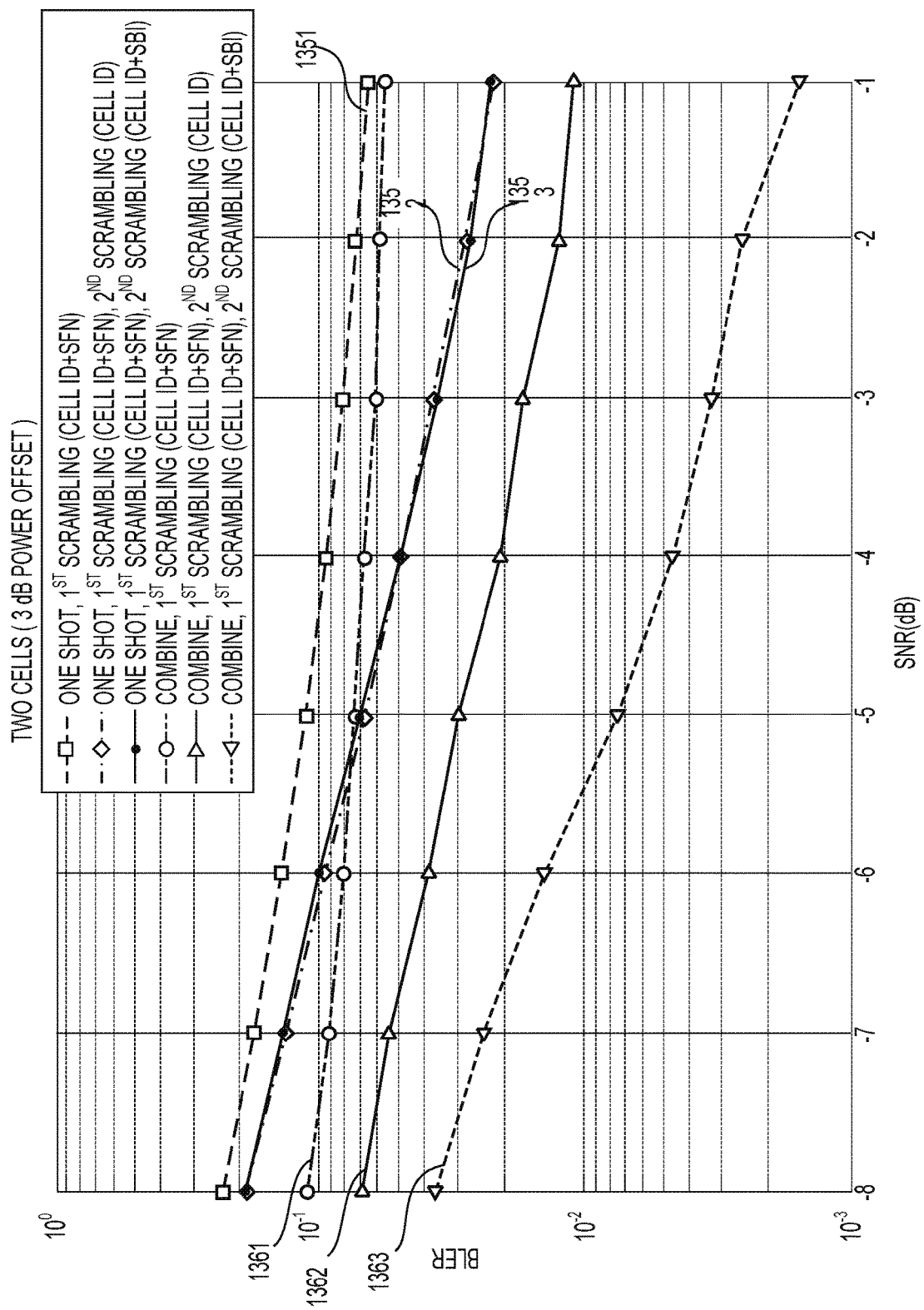

FIGS. 13A-13B show simulation results of PBCH processing with different scrambling configurations. Specifically, block error rate (BLER) versus signal noise ratio (SNR) curves (1301-1303, 1311-1313, 1351-1253, and 1361-1363) are shown to compare performance of PBCH processing and detection with different scrambling operations. As demonstrated, the 2nd scrambling operation based on cell ID and SBI as described herein improves the performance of PBCH detection across SS blocks within an SS block burst set.

The simulations of FIGS. 13A-13B are conducted in conditions of tapped delay line (TDL) mode C, 100 ns spread delay, and ideal CE. Simulations of FIG. 13A assumes two neighboring cells with 0 power offset, while simulations of FIG. 13B assumes two neighboring cells with a 3 dB power offset (serving cell with a lower transmission power). Both FIG. 13A and FIG. 13B show performance of PBCH processing and detection of the following six tests:

test 1: one-shot detection with 1st scrambling based on cell ID and SFN;

test 2: one-shot detection with 1st scrambling based on cell ID and SFN, and 2nd scrambling based on cell ID;

test 3: one-shot detection with 1st scrambling based on cell ID and SFN, and 2nd scrambling based on cell ID and SBI;

test 4: two-shot (soft-combination) detection with 1st scrambling based on cell ID and SFN;

test 5: two-shot (soft-combination) detection with 1st scrambling based on cell ID and SFN, and 2nd scrambling based on cell ID;

test 6: two-shot (soft-combination) detection with 1st scrambling based on cell ID and SFN, and 2nd scrambling based on cell ID and SBI.

By comparisons of tests 1-3 with tests 4-6 in both FIGS. 13A-13B, soft-combination detection demonstrates a higher performance than one-shot detection. Among the tests of 4-6 corresponding to the soft-combination detection scenarios, PBCH processing with 2nd scrambling based on cell ID and SBI (test 6) has a better performance than that with only 1st scrambling or with 2nd scrambling based on only cell ID (tests 5 and 4).

In addition, in FIG. 13A with 0 power offset between two neighboring cells, PBCH processing with 2nd scrambling based on cell ID and SBI (test 6) has about a 1.5 dB performance improvement compared with PBCH processing with 2nd scrambling based on only cell ID (test 5). In contrast, when a 3 dB power offset is present in FIG. 13B, PBCH processing with 2nd scrambling based on cell ID and SBI (test 6) has about a 4 dB performance improvement compared with PBCH processing with 2nd scrambling based on only cell ID (test 5). Accordingly, it can be seen that the 2nd scrambling operation based on cell ID and SBI as described herein improves the performance of PBCH detection across SS blocks within an SS block burst set.

Figure 14:
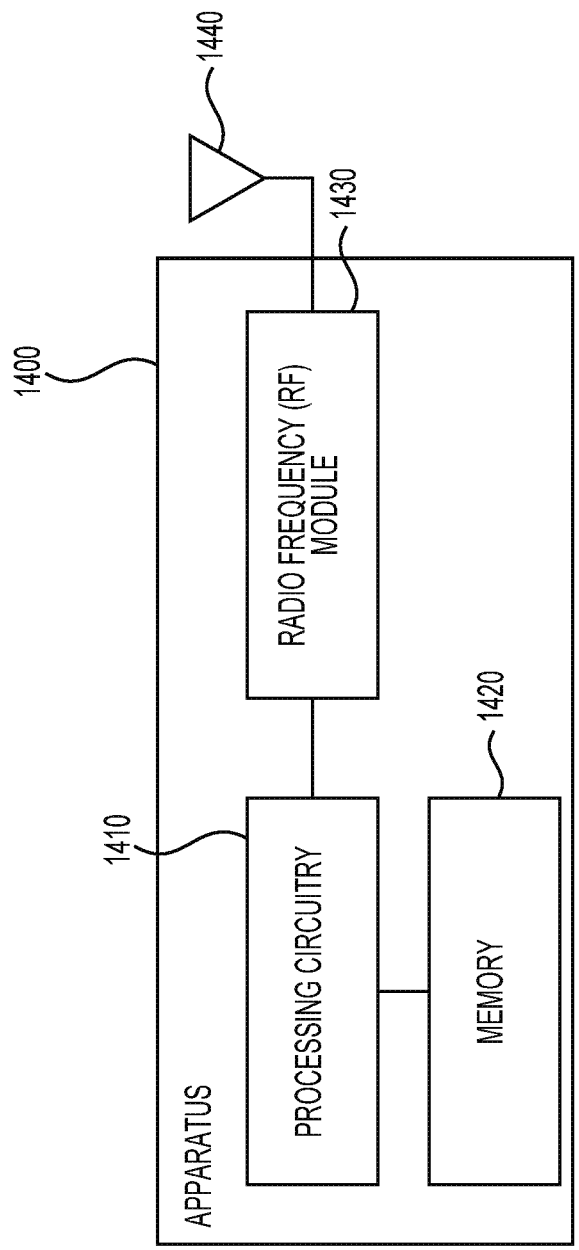
FIG. 14 shows an exemplary apparatus according to embodiments of the disclosure.

FIG. 14 shows an exemplary apparatus 1400 according to embodiments of the disclosure. The apparatus 1400 can be configured to perform various functions in accordance with one or more embodiments or examples described herein. Thus, the apparatus 1400 can provide means for implementation of techniques, processes, functions, components, systems described herein. For example, the apparatus 1400 can be used to implement functions of the UE 110, the BS 120 in various embodiments and examples described herein. The apparatus 1400 can be a general purpose computer in some embodiments, and can be a device including specially designed circuits to implement various functions, components, or processes described herein in other embodiments. The apparatus 1400 can include processing circuitry 1410, a memory 1420, and a radio frequency (RF) module 1430.

In various examples, the processing circuitry 1410 can include circuitry configured to perform the functions and processes described herein in combination with software or without software. In various examples, the processing circuitry can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1410 can be a central processing unit (CPU) configured to execute program instructions to perform various functions and processes described herein. Accordingly, the memory 1420 can be configured to store program instructions. The processing circuitry 1410, when executing the program instructions, can perform the functions and processes described herein. The memory 1420 can further store other programs or data, such as operating systems, application programs, and the like. The memory 1420 can include a read only memory (ROM), a random access memory (RAM), a flash memory, a solid state memory, a hard disk drive, an optical disk drive, and the like.

The RF module 1430 receives processed data signal from the processing circuitry 1410 and transmits the signal via an antenna 1440, or vice versa. The RF module 1430 can include a digital to analog convertor (DAC), an analog to digital converter (ADC), a frequency up convertor, a frequency down converter, filters, and amplifiers for reception and transmission operations. In some examples, the RF module 1430 can include multi-antenna circuitry (e.g., analog signal phase/amplitude control units) for beamforming operations. The antenna 1440 can include one or more antenna arrays.

The apparatus 1400 can optionally include other components, such as input and output devices, additional or signal processing circuitry, and the like. Accordingly, the apparatus 1400 may be capable of performing other additional functions, such as executing application programs, and processing alternative communication protocols.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

The invention claimed is:

1. A method, comprising:
performing, by processing circuitry, a first scrambling to a subset of physical broadcast channel (PBCH) information bits with a first scrambling code to generate first scrambled PBCH data at a base station (BS) in a wireless communication system;
performing, by the processing circuitry, a channel coding process to encode PBCH data including the first scrambled PBCH data to generate encoded PBCH data via polar coding, the encoded PBCH data to be carried in a synchronization signal block (SS block) associated with an SS block index (SBI), and to be transmitted from a cell having a cell identity (ID); and
performing, by the processing circuitry, a second scrambling to the encoded PBCH data to generate second scrambled PBCH data with a second scrambling code determined based on the cell ID and the SBI, the SBI being indicated by a demodulation reference signal (DMRS) associated with the SS block, the second scrambling being performed after the first scrambling to the subset of PBCH information bits and the channel coding process.

2. The method of claim 1, further comprising:
receiving the PBCH information bits corresponding to an SS block burst set contained in a half frame having a system frame number (SFN), the SS block burst set including the SS block having the SBI, wherein the first scrambling code is determined based on the cell ID and the SFN; and
adding cyclic redundancy check (CRC) bits to the first scrambled PBCH data to generate the PBCH data that is used as an input of the channel coding process to generate the encoded PBCH data.

3. The method of claim 1, wherein the second scrambling code is determined based on the cell ID and a set of least significant bits (LSBs) of the SBI.

4. The method of claim 3, further comprising:
generating a sequence including $2^X \cdot M$ bits, where X is a number of the set of LSBs of the SBI, M is a number of bits in the encoded PBCH data, and the sequence include $2^X$ non-overlapping portions each having M bits; and
using the X LSBs of the SBI to identify one of the $2^X$ non-overlapping portions to be the second scrambling code.

5. The method of claim 3, further comprising:
performing the second scrambling to the encoded PBCH data according to $$\tilde{b}(i)=(b(i)+c(i+vM_{bit}))\bmod 2,$$

where,
$b(0), \ldots, b(M_{bit}-1)$ are a block of bits in the encoded PBCH data, having a length of $M_{bit}$,
$\tilde{b}(0), \ldots, \tilde{b}(M_{bit}-1)$ are a block of scrambled bits in the second scrambled PBCH data having a length of $M_{bit}$,
$c(i)$ is a scrambling sequence initialized with the cell ID, and
v is the set of LSBs of the SBI.

6. The method of claim 1, wherein the second scrambling code is part of a sequence initialized according to $$c_{init}=((X \text{ LSBs of the SBI})+1) \cdot 2^{10}+(\text{the cell ID})$$

where $c_{init}$ represents an initial value, and X is a number of LSBs of the SBI.

7. The method of claim 1, wherein the second scrambling code is a part of a Gold sequence initialized by the cell ID.

8. The method of claim 1, wherein the second scrambling code is a part of a sequence initialized at the start of the SS block when or before the second scrambling is to take place, or at the start of an SS block burst set when or before a second scrambling for PBCH processing of a first SS block in the SS block burst set is to take place.

9. The method of claim 1, wherein the channel coding process includes a rate-matching process.

10. A method, comprising:
receiving, by processing circuitry, a first synchronization signal block (SS block) carrying a first physical broadcast channel (PBCH) from a cell at a user equipment (UE) in a wireless communication network, the first SS block being associated with a first SS block index (SBI), the cell having a cell identity (ID);
determining a set of least significant bits (LSBs) of the first SBI based on a demodulation reference signal (DMRS) in the first SS block, the DMRS indicating the set of LSBs;
determining a first scrambling code based on the cell ID and the set of LSBs of the first SBI determined based on the DMRS in the first SS block;
performing, by the processing circuitry, a demodulation to the first PBCH to generate first demodulated PBCH data;
performing a first descrambling to the first demodulated PBCH data with the first scrambling code determined based on the cell ID and the set of LSBs of the first SBI determined based on the DMRS to generate first descrambled PBCH data;
performing a channel decoding process to decode the first descrambled PBCH data to generate scrambled PBCH information bits and cyclic redundancy check (CRC) bits; and
when a CRC check based on the CRC bits is successful, performing a second descrambling to the scrambled PBCH information bits with a second scrambling code to recover PBCH information bits, the first descrambling to the first demodulated PBCH data being performed before the second descrambling to the scrambled PBCH information bits and the channel decoding process.

11. The method of claim 10, further comprising:
when the CRC check based on the CRC bits is unsuccessful,
receiving a second SS block carrying a second PBCH from the cell, the second SS block having a second SS block index (SBI), the first and second SS blocks belonging to a same SS block burst set;
performing a demodulation to the second PBCH to generate second demodulated PBCH data;
performing a third descrambling to the second demodulated PBCH data with a third scrambling code determined based on the cell ID and the second SBI to generate second descrambled PBCH data; and
performing a channel decoding process based on a soft-combination of the first and second descrambled PBCH data.

12. The method of claim 10, further comprising:
receiving a sequence including $2^X \cdot M$ bits, where X is a number of the set of LSBs of the first SBI, M is a number of bits in the first demodulated PBCH data, and the sequence include $2^X$ non-overlapping portions each having M bits; and
using the X LSBs of the first SBI to identify one of the $2^X$ non-overlapping portions to be the first scrambling code.

13. The method of claim 10, further comprising:
performing the first descrambling to the first demodulated PBCH data according to $$\tilde{b}(i)=(b(i)+c(i+vM_{bit})) \bmod 2,$$

where,
$b(0), \ldots, b(M_{bit}-1)$ are a block of bits in the demodulated PBCH data, having a length of $M_{bit}$,
$\tilde{b}(0), \ldots, \tilde{b}(M_{bit}-1)$ are a block of descrambled bits in the first descrambled PBCH data having a length of $M_{bit}$,
$c(i)$ is a scrambling sequence initialized with the cell ID, and
v is the set of LSBs of the first SBI.

14. The method of claim 10, wherein the first scrambling code is part of a sequence initialized according to $$c_{init}=((X \text{ LSBs of the SBI})+1) \cdot 2^{10}+(\text{the cell ID})$$

where $c_{init}$ represents an initial value, and X is a number of the set of LSBs of the first SBI.

15. The method of claim 10, wherein the first scrambling code is a part of a Gold sequence initialized by the cell ID.

16. The method of claim 10, wherein the first scrambling code is a part of a sequence initialized at the start of the first SS block when or before the first descrambling is to take place, or at the start of an SS block burst set when or before a descrambling for processing demodulated PBCH data of an SS block positioned at the beginning of the SS block burst set is to take place.

17. A user equipment (UE), comprising processing circuitry configured to:
receive a first synchronization signal block (SS block) carrying a first physical broadcast channel (PBCH) from a cell in a wireless communication network, the first SS block being associated with a first SS block index (SBI), the cell having a cell identity (ID);
determine a set of least significant bits (LSBs) of the first SBI based on a demodulation reference signal (DMRS) in the first SS block, the DMRS indicating the set of LSBs;
determine a first scrambling code based on the cell ID and the set of LSBs of the first SBI determined based on the DMRS in the first SS block;
perform a demodulation to the first PBCH to generate first demodulated PBCH data;
perform a first descrambling to the first demodulated PBCH data with the first scrambling code determined based on the cell ID and the set of LSBs of the first SBI determined based on the DMRS to generate first descrambled PBCH data;
perform a channel decoding process to decode the first descrambled PBCH data to generate scrambled PBCH information bits and cyclic redundancy check (CRC) bits; and
when a CRC check based on the CRC bits is successful, perform a second descrambling to the scrambled PBCH information bits to recover PBCH information bits with a second scrambling code to recover PBCH information bits, the first descrambling to the first demodulated PBCH data being performed before the second descrambling to the scrambled PBCH information bits and the channel decoding process.

18. The UE of claim 17, wherein the processing circuitry is further configured to:
when the CRC check based on the CRC bits is unsuccessful,
receive a second SS block carrying a second PBCH from the cell, the second SS block having a second SS block index (SBI), the first and second SS block belonging to a same SS block burst set;
perform a demodulation to the second PBCH to generate second demodulated PBCH data;
perform a third descrambling operation to the second demodulated PBCH data with a third scrambling code determined based on the cell ID and the second SBI to generate second descrambled PBCH data; and
perform a channel decoding process based on a soft-combination of the first and second descrambled PBCH data.

19. The UE of claim 17, wherein the processing circuitry is further configured to:
receive a sequence including $2^X \cdot M$ bits, where X is a number of the set of least significant bits (LSBs) of the first SBI, M is a number of bits in the first demodulated PBCH data, and the sequence include $2^X$ non-overlapping portions each having M bits; and
use the X LSBs of the first SBI to identify one of the $2^X$ non-overlapping portions to be the first scrambling code.

* * * * *